(12) United States Patent
Cohen (10) Patent No.: US 12,237,777 B2
(45) Date of Patent: Feb. 25, 2025

(54) LLC CONVERTER AND CONTROL

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

(21) Appl. No.: 17/348,542

(22) Filed: Jun. 15, 2021

(65) Prior Publication Data

US 2022/0399821 A1    Dec. 15, 2022

(51) Int. Cl.
*H02M 3/335* (2006.01)
*H02M 7/48* (2007.01)

(52) U.S. Cl.
CPC ... *H02M 3/33584* (2013.01); *H02M 3/33538* (2013.01); *H02M 3/33576* (2013.01); *H02M 3/33592* (2013.01); *H02M 7/4818* (2021.05)

(58) Field of Classification Search
CPC ........ H02M 3/33584; H02M 3/33538; H02M 3/33576; H02M 3/33592; H02M 7/4818
See application file for complete search history.

(56) References Cited

U.S. PATENT DOCUMENTS

| | | | | |
|---|---|---|---|---|
| 5,398,181 A * | 3/1995 | Yeh | ................... | H02M 3/33507 363/95 |
| 5,991,167 A * | 11/1999 | Van Lerberghe | ........................... | H02M 3/33592 363/16 |
| 6,301,128 B1 * | 10/2001 | Jang | ................... | H02M 3/33576 363/127 |
| 6,442,047 B1 * | 8/2002 | Cohen | ............... | H02M 3/33592 363/17 |
| 8,064,229 B2 * | 11/2011 | Stuler | ............... | H02M 3/33592 363/21.02 |
| 8,174,851 B2 * | 5/2012 | Elferich | .............. | H02M 3/3376 363/21.02 |
| 8,503,199 B1 * | 8/2013 | Chapuis | .............. | H02M 1/0085 363/21.06 |
| 9,001,539 B2 * | 4/2015 | Oh | ...................... | H02M 1/4241 363/125 |
| 9,124,190 B2 * | 9/2015 | Karlsson | ........... | H02M 3/33592 |
| 9,369,178 B2 * | 6/2016 | Matsutani | ................ | H04B 3/54 |
| 9,444,346 B2 * | 9/2016 | Chen | ................. | H02M 3/33576 |
| 10,199,957 B1 * | 2/2019 | Prakash | ................... | H02M 1/44 |
| 10,404,104 B2 * | 9/2019 | Takeda | .................... | H02J 50/12 |
| 10,673,343 B1 * | 6/2020 | Tong | .................... | H02M 3/3376 |
| 11,258,368 B2 * | 2/2022 | Jiang | .................... | H02M 1/0016 |
| 11,349,401 B1 * | 5/2022 | Zafarana | ................ | H02M 1/342 |
| 2001/0054881 A1 * | 12/2001 | Watanabe | ......... | H02M 3/33576 320/166 |
| 2003/0086280 A1 * | 5/2003 | Bourdillon | ........ | H02M 3/33561 363/21.12 |

(Continued)

*Primary Examiner* — Yusef A Ahmed
(74) *Attorney, Agent, or Firm* — Ray A. King; Frank D. Cimino (57) ABSTRACT

A voltage converter, including an input adapted to couple to a voltage source and a transformer including a primary coil and a secondary coil. Primary side circuitry, including a first switching circuit, is coupled to the primary coil. A second switching circuit is coupled between a first terminal and a second terminal of the secondary coil, and configured to selectively close to short circuit the first terminal to the second terminal.

18 Claims, 8 Drawing Sheets

(56) References Cited

U.S. PATENT DOCUMENTS

| | | | |
|---|---|---|---|
| 2004/0218406 A1* | 11/2004 | Jang | H02J 50/12 363/37 |
| 2005/0099827 A1* | 5/2005 | Sase | H02M 3/33571 363/16 |
| 2008/0192509 A1* | 8/2008 | Dhuyvetter | H02M 3/33523 363/16 |
| 2008/0259657 A1* | 10/2008 | Dikken | H02M 3/33584 363/26 |
| 2009/0059622 A1* | 3/2009 | Shimada | H02M 1/32 363/17 |
| 2010/0177536 A1* | 7/2010 | Liu | H02M 3/33592 363/127 |
| 2011/0007529 A1* | 1/2011 | Usui | H02M 3/01 363/21.12 |
| 2011/0090717 A1* | 4/2011 | Lee | H02M 3/33584 363/21.02 |
| 2011/0317450 A1* | 12/2011 | Cheng | H02M 1/4258 363/20 |
| 2012/0098341 A1* | 4/2012 | Shimada | H02M 3/33507 307/43 |
| 2012/0262967 A1* | 10/2012 | Cuk | H02M 7/4807 363/131 |
| 2012/0294047 A1* | 11/2012 | Wang | H02M 3/33576 363/21.02 |
| 2012/0300524 A1* | 11/2012 | Fornage | H02M 5/297 363/132 |
| 2013/0194827 A1* | 8/2013 | Chen | H02M 3/3376 363/16 |
| 2013/0265804 A1* | 10/2013 | Fu | H02M 3/33576 363/17 |
| 2013/0314951 A1* | 11/2013 | Harrison | H02M 3/33592 363/21.02 |
| 2014/0159811 A1* | 6/2014 | Chen | H03F 3/24 330/251 |
| 2014/0160803 A1* | 6/2014 | Sato | H02M 3/33507 363/21.01 |
| 2014/0198536 A1* | 7/2014 | Fu | H02M 1/14 363/17 |
| 2014/0313784 A1* | 10/2014 | Strzalkowski | H02M 3/33584 363/17 |
| 2014/0376272 A1* | 12/2014 | Miao | H02M 3/33592 363/21.02 |
| 2015/0015071 A1* | 1/2015 | Deboy | H02M 3/33592 307/31 |
| 2015/0023062 A1* | 1/2015 | Hyugaji | H02M 3/33592 363/16 |
| 2015/0124492 A1* | 5/2015 | Fu | H02M 3/33546 363/21.02 |
| 2015/0131329 A1* | 5/2015 | Chen | H02M 3/3385 363/17 |
| 2015/0229200 A1* | 8/2015 | Schwartz | H02M 1/083 363/21.03 |
| 2015/0229219 A1* | 8/2015 | Choi | H02M 3/01 363/21.02 |
| 2015/0229225 A1* | 8/2015 | Jang | H02M 3/285 363/17 |
| 2016/0181927 A1* | 6/2016 | Chang | H02M 1/42 363/21.02 |
| 2016/0190946 A1* | 6/2016 | Fu | H02M 3/33546 363/21.02 |
| 2016/0261204 A1* | 9/2016 | Kikuchi | H02M 3/33523 |
| 2016/0294296 A1* | 10/2016 | Lee | H02M 1/44 |
| 2017/0104409 A1* | 4/2017 | Cohen | H02M 1/10 |
| 2017/0117731 A1* | 4/2017 | Shimada | H02M 3/33507 |
| 2017/0187298 A1* | 6/2017 | Lin | H02M 3/33523 |
| 2018/0145595 A1* | 5/2018 | Fontana | H02M 1/12 |
| 2018/0175737 A1* | 6/2018 | Kikuchi | H02M 3/33592 |
| 2018/0302000 A1* | 10/2018 | Moon | H02M 3/33592 |
| 2019/0068071 A1* | 2/2019 | Jia | H02M 3/3376 |
| 2019/0267906 A1* | 8/2019 | Zhang | H02M 1/083 |
| 2019/0280605 A1* | 9/2019 | Krzywinski | H02J 7/35 |
| 2019/0334428 A1* | 10/2019 | Arima | H02M 3/33507 |
| 2020/0052603 A1* | 2/2020 | Lu | H02M 3/33592 |
| 2020/0076315 A1* | 3/2020 | Peng | H02M 3/33576 |
| 2020/0195018 A1* | 6/2020 | Liu | H02M 7/797 |
| 2020/0195159 A1* | 6/2020 | Krzywinski | H02J 7/0068 |
| 2020/0274457 A1* | 8/2020 | Kajiyama | H02M 3/335 |
| 2020/0287472 A1* | 9/2020 | Ye | H02M 3/01 |
| 2020/0304033 A1* | 9/2020 | Escudero Rodriguez | H02M 3/33523 |
| 2020/0336076 A1* | 10/2020 | Qian | H02M 3/33584 |
| 2020/0366215 A1* | 11/2020 | Chen | H02M 3/33576 |
| 2020/0373785 A1* | 11/2020 | Bagchi | B63G 8/00 |
| 2020/0373847 A1* | 11/2020 | Saha | H02M 3/33576 |
| 2021/0191892 A1* | 6/2021 | Yu | H02J 3/0073 |
| 2021/0288574 A1* | 9/2021 | Cohen | H02M 1/0095 |
| 2022/0230797 A1* | 7/2022 | Afsharian | H01F 27/38 |
| 2023/0246556 A1* | 8/2023 | Gu | H02M 3/33584 |

* cited by examiner

LLC CONVERTER AND CONTROL

CROSS-REFERENCE TO RELATED APPLICATION

Not applicable.

BACKGROUND

This relates generally to LLC converters.

An LLC converter is so named as it includes two inductors (each respectively indicated by one "L" in "LLC") and a capacitor (indicated by the "C" in "LLC"). Typically the LLC converter either boosts (increases) or bucks (decreases) an input voltage to a corresponding output DC voltage. For example, the input voltage is coupled through switches to the LLC tank, and in one switched phase the tank stores energy and passes some energy to an output capacitor, while in another switched phase the stored tank energy is passed to the output capacitor.

Some prior art LLC converters maintain an output voltage using closed loop feedback to adjust the LLC switching frequency in order to maintain the output voltage. These prior art LLC converters typically monitor the converter output voltage, and if the output voltage exceeds the desired output, the switching frequency is adjusted upward to buck the output voltage, whereas if the output voltage is below the desired output, the switching frequency is adjusted downward to boost the output voltage. If the input voltage range is large, this approach typically requires relatively large LLC components to support the varying switching frequency, and such larger components increase device size and cost. The example embodiments seek to improve upon such considerations.

SUMMARY

A voltage converter, comprising an input adapted to couple to a voltage source and a transformer including a primary coil and a secondary coil. Primary side circuitry, including a first switching circuit, is coupled to the primary coil. A second switching circuit is coupled between a first terminal and a second terminal of the secondary coil, and configured to selectively close to short circuit the first terminal to the second terminal.

DETAILED DESCRIPTION

Figure 1A:
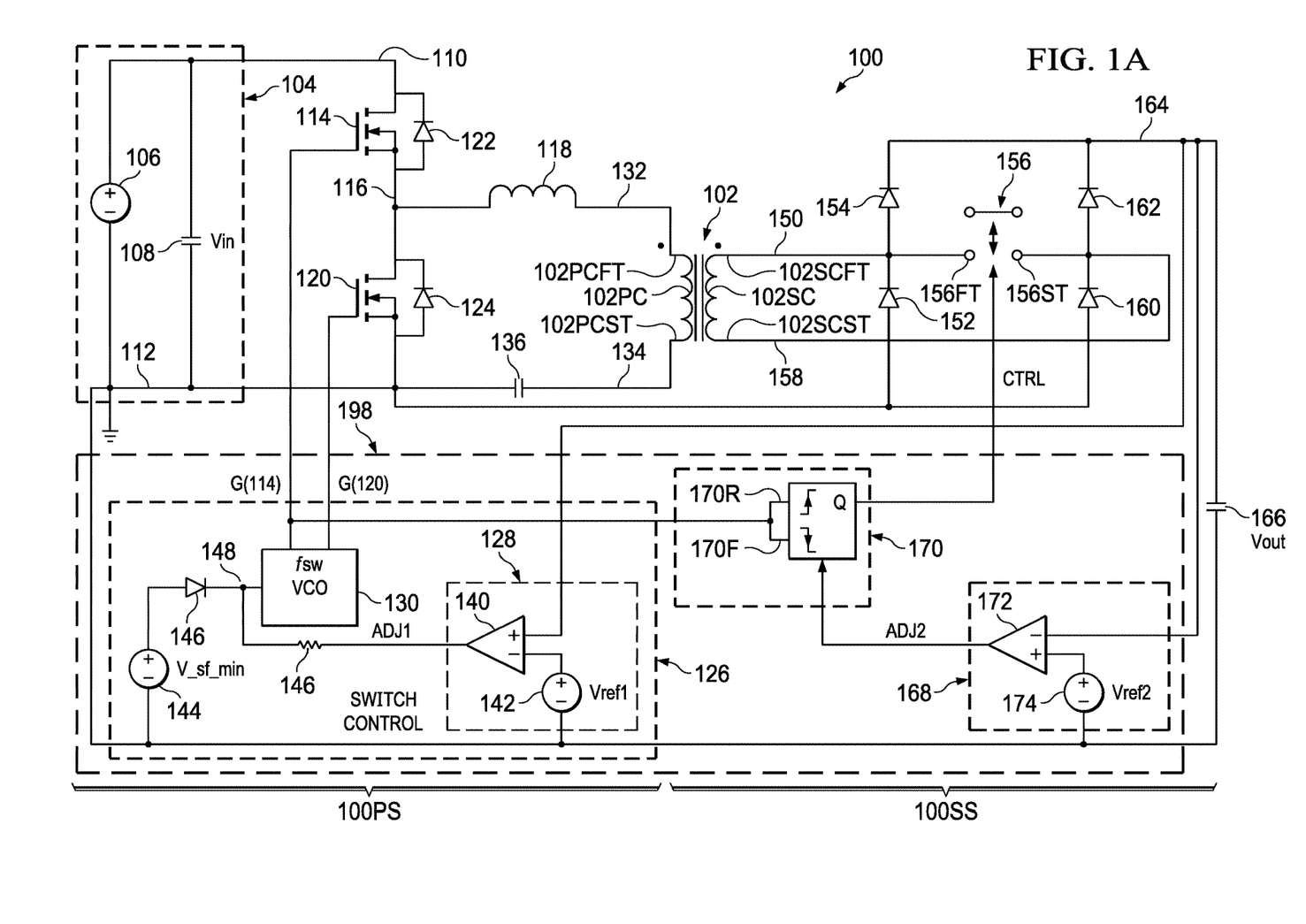
FIG. 1A is an electrical diagram of an example embodiment LLC converter.

FIG. 1A is an electrical diagram of an example embodiment LLC converter 100, which converts a DC input voltage Vin to a DC output voltage Vout. The converter 100 includes a transformer 102. The transformer 102 includes a transformer primary coil 102PC and a transformer secondary coil 102SC, and correspondingly the converter 100 includes a primary side 100PS and a secondary side 100SS. The transformer 102 also includes a magnetizing inductance, not separately shown, but incorporated in the LLC converter as known in the art and sometimes referred to with a designation of Lm. The transformer 102 also generally affects the converter efficiency, volume, power density, and reliability, and the turn ratio between the transformer primary coil 102PC and the transformer secondary coil 102SC also can control the nominal ratio of Vout to Vin.

The converter primary side 100PS includes a voltage supply 104, for example including a voltage source 106 connected in parallel with a capacitor 108, that is, both are connected between a first node 110 and a second node 112. The second node 112 is connected to a low reference potential, such as ground. Generally, the voltage source 106 is regulated, for example rectified from an AC line to DC. The capacitor 108 is sometimes referred to as a "hold up" capacitor, in that it stores energy that keeps the converter 100 operating if the voltage source 106 is temporarily reduced, interrupted, or disconnected.

Also in the primary side 100PS, the first node 110 is connected to a drain of a first transistor 114, for example an NMOS enhancement transistor. The source of the first transistor 114 is connected to a third node 116, which is further connected to a first terminal of an inductor 118, and to a drain of a second transistor 120, also for example an NMOS enhancement transistor. The source of the second transistor 120 is connected to the second node 112. An anode of a first body diode 122, of the first transistor 114, is connected to the third node 116, and the cathode of the first body diode 122 is connected to the first node 110. An anode of a second body diode 124, of the second transistor 120, is connected to the second node 112, and the cathode of the second body diode 124 is connected to the third node 116. The gate of the first transistor 114 and the gate of the second transistor 120 are connected to respective gate switching signals, G(114) and G(120), provided from a switch control circuit 126. The switch control circuit 126 include a first error amplifier circuit 128 and a voltage controlled oscillator (VCO) 130, and as detailed below the VCO 130 outputs the gate switching signals G(114) and G(120) at a variable converter switching frequency fsw. Accordingly, the first transistor 114 and the second transistor 116, and the associated connections, provide a switching circuit for the converter 100, operating at fsw. A second terminal of the inductor 118 is connected to a fourth node 132, which is further connected to a first terminal 102PCFT of the transformer primary coil 102PC. A second terminal 102PCST of the transformer primary coil 102PC is connected to a fifth node 134. A capacitor 136 is connected between the fifth node 134 and the second node 112. Accordingly, the inductor 118, the magnetics of the transformer 102, and the capacitor 136, collectively form an LLC resonant tank circuit for the converter 100.

Returning to additional detail of the switch control circuit 126, the first error amplifier circuit 128 includes an amplifier 140, having a non-inverting input coupled to the converter 100 output voltage Vout and an inverting input coupled to a first voltage reference source 142, which outputs a first reference voltage Vref1. As detailed later, Vref1 is established so that a signal ADJ1, which is the output of the first error amplifier 128, tends toward, and settles at, the value necessary to minimize/nullify the difference between the two inputs to the amplifier 140 (Vout and Vref1). As an example for use in this document, suppose that the converter 100 product specification provides for a nominal output of 100 VDC, then Vref1 may be 100 VDC. A minimum frequency switching voltage supply 144 is connected between the anode of a diode 146 and the second node 112, and it outputs a minimum switching frequency voltage V_sf_min. The cathode of the diode 146 is connected to a sixth node 148. The sixth node 148 is also connected as a voltage input to the VCO 130. Accordingly, the voltage output of the diode 146 and resulting from V_sf_min, and the voltage output of the first error amplifier circuit 128, combine at the sixth node 148 as an input voltage to the VCO 130, which in response proportionally provides the gate switching signals G(114) and G(120) at the switching frequency fsw.

In the converter secondary side 100SS, a first terminal 102SCFT of the transformer secondary coil 102SC is connected to a seventh node 150. The seventh node 150 is connected to a cathode of a first diode 152, an anode of a second diode 154, and to a first terminal 156FT of a bidirectional switch 156. The bidirectional switch 156 may be implemented by two semiconductor switches, connected for example in anti-series, where examples are shown in later Figures. A second terminal 102SCST of the transformer secondary coil 102SC is connected to an eighth node 158, which is connected to a cathode of a third diode 160, an anode of a fourth diode 162, and to a second terminal 156ST of the switch 156. A cathode of the second diode 154 and a cathode of the fourth diode 162 are connected to a ninth node 164. Accordingly, the first through fourth diodes 152, 154, 160, and 162, and the associated connections, provide a rectifier for the converter 100. An output capacitor 166 is connected between the ninth node 164 and the second node 112, with the comparator 100 output voltage, Vout, across the output capacitor 166, that is, between the ninth node 164 and the second node 112.

The converter secondary side 100SS also includes a second error amplifier circuit 168, connected between the ninth node 164 and a one shot 170. The second error amplifier circuit 168 includes an amplifier 172, having an inverting input coupled to the ninth node 164 (and accordingly to Vout) and a non-inverting input coupled to a second voltage reference source 174, which outputs a second reference voltage Vref2. Vref2 is established to be less than Vref1, which recall is a reference voltage in the first error amplifier circuit 128. As an example for use in this document, and continuing with the earlier example in which the converter 100 product specification provides for a nominal output of 100 VDC, then Vref2 may be 99.9 VDC. Further, the second error amplifier 168 provides an output ADJ2 that tends toward, and settles at, the value necessary to minimize/nullify the difference between the two inputs to the amplifier 172 (Vout and Vref2). Accordingly and as detailed later, for fluctuations in Vout below Vref2, ADJ2 provides additional adjustments, beyond those provided by ADJ1 from the first amplifier error 128, to return Vout to a preferable level of at least Vref1. Particularly, ADJ2 is connected as a duration signal to the one shot 170. Further, the one shot 170 includes a rising edge trigger input 170R and a falling edge trigger input 170F, both of which are connected to the gate switching signal G(114). Accordingly, when the gate switching signal G(114) transitions either high or low, it triggers the one shot 170 such that its data output (Q) will output a signal CTRL that is high for a duration proportional to ADJ2. When CTRL is asserted, the switch 156 closes, and when CTRL is de-asserted, the switch 156 opens.

When the switch 156 is open, for example when CTRL is de-asserted after the settling to zero time of the second error amplifier circuit 168, the data converter 100 generally energizes the LLC tank circuit and transfers that power to the output capacitor 166. Particularly, when the gate switching signal G(114) is asserted, the first transistor 114 begins to turn on, and resonant current starts to flow through the tank circuit of the primary side 100PS, generally clockwise by convention in FIG. 1. Concurrently, power is transmitted from the transformer primary coil 102PC to the transformer secondary coil 102SC, so that current flows through the rectifier circuit in the secondary side 100SS, and more particularly at this time also in a clockwise direction, that is, with secondary coil first terminal 102SCFT at a positive polarity. Accordingly, current flows through the second and third diodes 154 and 160, and through the output capacitor 166. Meanwhile also in the primary side 100PS and due to the polarity across the magnetizing inductance Lm of the transformer 102, linearly increasing magnetizing current flows through the first body diode 122 and through the tank circuit of the primary side 100PS, generally counterclockwise by convention in FIG. 1, as the first transistor 114 continues to turn fully on. Once the first transistor 114 is fully on, the resonant current continues to increase and reaches a peak, and at that time the polarity of the magnetizing current changes, thereby reversing its flow direction to clockwise and through the fully-on first transistor 114 (and no longer through the first body diode 122), while resonant current begins to diminish.

Once resonant current stops and continuing with the scenario of the switch 156 open, only magnetizing current flows until it reaches a peak, and at that peak the switch control circuit 126 turns off the first transistor 114 by disabling the gate switching signal G(114). Thereafter, the switch control circuit 126 turns on the second transistor 120 by enabling the gate switching signal G(120). The second transistor 120 begins to turn on, and again resonant current starts to flow through the tank circuit of the primary side 100PS, now generally counterclockwise by convention in FIG. 1. Concurrently, power is transmitted from the transformer primary coil 102PC to the transformer secondary coil 102SC, so that current flows through the rectifier circuit in the secondary side 100SS, and more particularly at this time also in a counterclockwise direction, that is, with secondary coil second terminal 102SCST at a positive polarity. Accordingly, current flows through the fourth and first diodes 162 and 152, respectively, and through the output capacitor 166. Meanwhile also in the primary side 100PS and due to the polarity across the magnetizing inductance Lm of the transformer 102, linearly increasing magnetizing current flows through the second body diode 124, of the second transistor 120, and through the tank circuit of the primary side 100PS, generally clockwise by convention in FIG. 1, as the second transistor 120 continues to turn fully on. Once the second transistor 120 is fully on, the resonant current continues to increase and reaches a peak, and at that time the polarity of the magnetizing current changes, thereby reversing its flow direction to clockwise and through the fully-on second transistor 120 (and no longer through the second body diode 124), while resonant current begins to diminish. Once resonant current stops, only magnetizing current flows until it reaches a peak and at that peak the switch control circuit 126 turns off the second transistor 120 by disabling the gate switching signal G(120).

The above process repeats as described, alternating one cycle of on-operation of the first transistor 114, followed by turning it off and then one cycle of on-operation of the second transistor 120, followed by turning it off, and so forth, so long as Vout remains above Vref2. During these operations, the converter 100 continues to convert Vin to Vout. Also during these operations, if Vout increases or decreases by more than Vref1, then the first error amplifier circuit 128 outputs a responsive signal ADJ1 that adds to the sixth node 148 and thereby alters the total input voltage to the VCO 130. For example, if Vout increases by more than Vref1, then ADJ1 increases to increase fsw, thereby reducing Vout. As another example, if Vout decreases by more than Vref1, then ADJ1 decreases to decrease fsw, thereby increasing Vout. Accordingly, for such deviations, the VCO 130 responsively adjusts the switching frequency fsw either up or down, so that the on-time of each of the first and second transistors 114 and 120 is altered in order to either buck or boost Vout to a range between the specification output plus or minus Vref1.

Given the preceding, if Vin decreases, the output voltage of the amplifier 140 decreases to reduce fsw in order to maintain an output voltage equal to Vref1. Since the diode 146 clamps the input of the VCO 130 to the value V_sf_min of the voltage source 144, the error amplifier 140 loses control of Vout when Vin voltage drops below a certain value. At this point, as described below, additional operations of the converter 100 are activated.

Figure 1B:
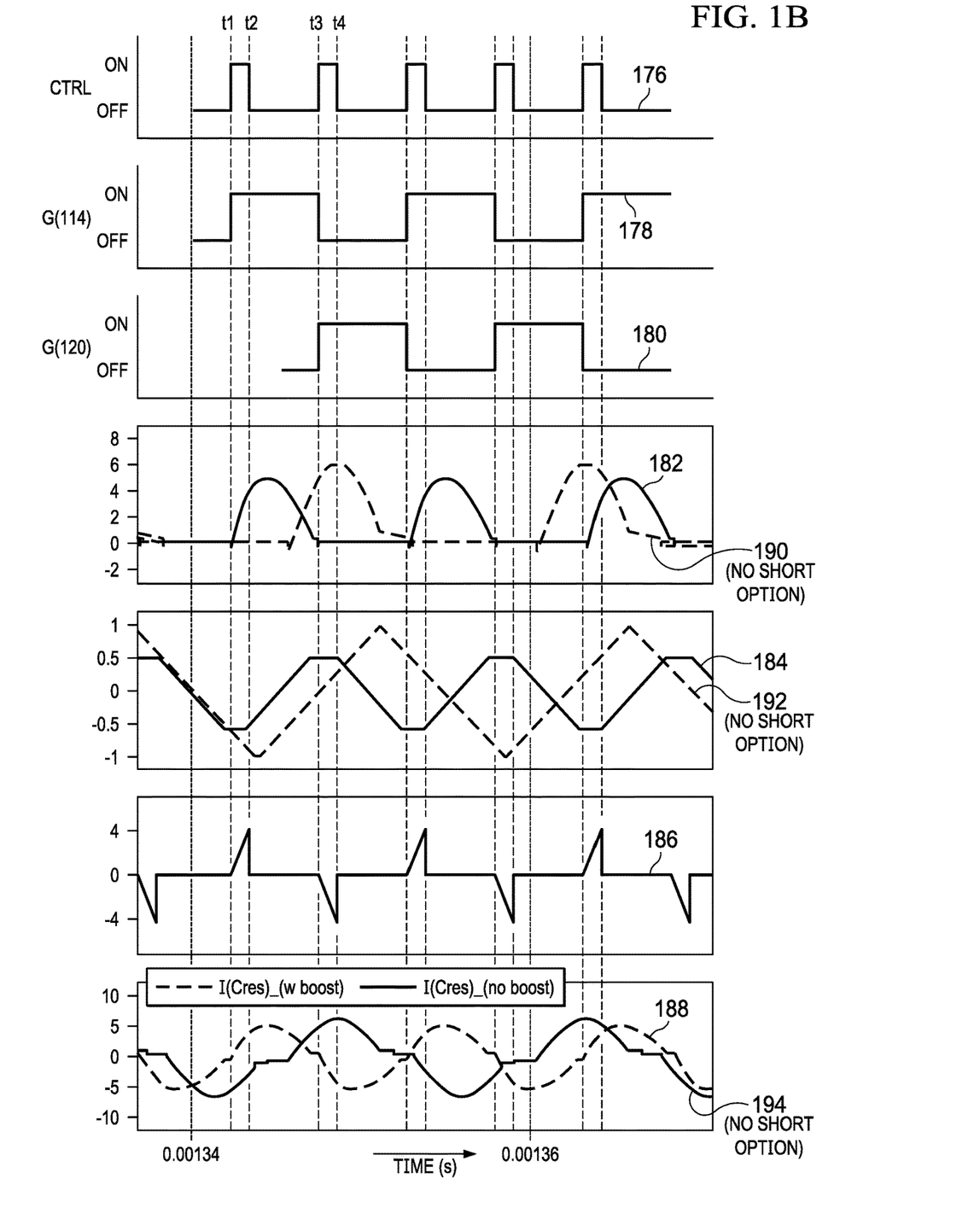
FIG. 1B illustrates a simulated timing diagram example of various signals associated with the FIG. 1A converter.

The operation of the converter 100 with respect to Vref2 is now described in connection also with FIG. 1B, which illustrates a simulated timing diagram example of various signals associated with the converter 100. Particularly, the FIG. 1B first row is a plot 176 of the switch 156 controlling CTRL signal, the second row is a plot 178 of the first transistor 114 gate switching signal G(114), the third row is a plot 180 of the second transistor 120 gate switching signal G(120), the fourth row is a plot 182 of current through the first transistor 114, the fifth row is a plot 184 of current through Lm, the sixth row is a plot 186 of current through the switch 156, and the seventh row is a plot 188 of current through the capacitor 136. Additionally, the plots 182, 184, and 188 of the fourth, fifth, and seventh rows, respectively, show current required to drive Vout with the switch 156 included, while for sake of contrast, each of those rows also shows an alternative respective additional plot 190, 192, and 194, illustrating the higher current that would be required if the switch 156 were not included in the converter 100.

The second error amplifier circuit 168 responds when Vout is below Vref2 by outputting a non-zero ADJ2 to settle that (Vout-Vref2) difference to zero. In response to the non-zero ADJ2 signal, the one shot 170 asserts CTRL, upon receiving a next rising signal transition of the gate switching signal G(114), for example as shown in FIG. 1B at t1 in plots 176 and 178. Further, the one shot 170 asserts CTRL for a duration that is less than a nominal on-period of a switching transistor 114 or 120, and also that is proportional to the magnitude of ADJ2, with the duration shown in the FIG. 1B time period from t1 to t2 as shown in plot 176. During that time period, the switch 156 closes, and current passes through the switch 156 as shown in plot 186, thereby short-circuiting together the secondary terminals 102SCFT and 102SCST. Accordingly, from t1 to t2, the short-circuited secondary coil 102SC causes the primary coil 102PC to present little or zero resistance on the primary side 100PS, so that Vin energy accumulates across the inductor 118 in the primary side 100PS, higher relative to what it is when the switch 156 is open (if the secondary coil 102SC were not short-circuited). At t2, the one shot 170 de-asserts CTRL as shown in the plot 176, and in response the switch 156 opens so that current no longer flows through it as shown in the plot 186, thus removing the short-circuit between the secondary terminals 102SCFT and 102SCST. Accordingly, the additional energy previously accumulated to the inductor 118 is available for transfer, by the transformer 102, from the primary side 100PS to the secondary side 100SS, for the remainder of the period that the first transistor 114 is on, which is until t3.

At t3, if ADJ2 of the second error amplifier 168 has not settled to zero, for example if Vout remains below VRref2 or if an immediately preceding instance of Vout below Vref2 leaves a residual non-zero output from the second error amplifier 168, then the above process generally repeats, with respect to the second switch 120. Particularly, in response to the non-zero ADJ2 signal, the one shot 170 again asserts CTRL, upon receiving a next rising signal transition of the gate switching signal G(120), as shown in FIG. 1B at t3 in the plots 176 and 180. Again the one shot 170 asserts CTRL for a duration that is proportional to the then-existing value of ADJ2, shown in the FIG. 1B plot 176 from t3 to t4, during which again the switch 156 again closes, and current passes through the switch 156, now in the reverse direction as that shown from t1 to t2, as shown by the opposite polarity in the plot 186, thus again short-circuiting together the secondary terminals 102SCFT and 102SCST. Accordingly, from t3 to t4, energy from the capacitor 132 is accumulated to the inductor 118, greater than if the secondary coil 102SC were not short-circuited. At t4, the one shot 170 de-asserts CTRL and in response the switch 156 opens, open circuiting the prior short-circuit connection between secondary terminals 102SCFT and 102SCST, and thereafter allowing the additional energy previously accumulated to the inductor 118 to transfer, by the transformer 102, from the primary side 100PS to the secondary side 100SS, for the remainder of the period that the second transistor 120 is on, which is until t4.

The above process repeats until the ADJ2 output of the second error amplifier circuit 168 settles to zero, that is, fully responding to the ongoing or preceding instance when Vout is or was less than Vref2. Each such repetition stores a relatively larger energy in the inductor 118 as part of the primary side 100PS tank circuit and transfers it to the secondary side 100SS, until ADJ2 settles to zero, that is, having resolved the low Vout condition relative to Vref2. Further, once such resolution has been achieved, the second error amplifier circuit 168 outputs ADJ2=0, CTRL thereafter is not asserted, and the switch 156 is responsively open. In response, operation of the converter 100 proceeds as described above.

Given the preceding, the converter 100 is dynamically adaptive to stabilize Vout at a desirable value, for example at the product specification output value for the converter 100. In one example embodiment, the stabilization is achieved in part by a first error nullification in comparison to a threshold Vref2 that controls a switch 156 to store additional energy in the transfer primary side 100PS, and also in part by a second error nullification in comparison to a threshold Vref1 that controls operational switching frequency fsw to either boost or buck Vout. Further, in FIG. 1B, the plots 190, 192, and 194, each labeled "no short option," indicate the current that would be required to maintain Vout if the switch 156 were not included in the converter 100. In each of those plots, more current is required to maintain Vout, as compared to the plots 182, 184, and 188, respectively, as achieved by the converter 100 which includes the switch 156 and its operation. Accordingly, the example embodiment converter 100 is able to operate at lower currents, and as a result it can be constructed using smaller devices (conducting the lower current amounts) and incur lower losses than are involved in a conventional LLC converter, which does not include the switch 156 or other apparatus and technique for temporarily short-circuiting the transformer circuitry during energy accumulation in the primary side. Also, the inductance of the inductor 118 can be reduced considerably. Additionally, the converter 100 also operates to maintain Vout in a manner that relies less on the need, that some prior art LLC converters impose, to more aggressively adjust the converter switching frequency fsw downward to boost Vout to a regulated level. By reducing or eliminating operational frequencies below resonance, the risk for capacitive switching is likewise virtually eliminated. Lastly in connection with the preceding, in some example embodiments, certain of the above circuitry and/or functionality may be in separate parts. For example, as shown by dashed outline in FIG. 1A (and other later-discussed figures), an integrated circuit controller 198 may be provided that includes portions or all of the switch control circuit 126, the second error amplifier circuit 168, and the one shot 170. The integrated circuit controller 198 is connected to the LLC converter 100 primary side 100PS and secondary side 100SS as otherwise illustrated in the various Figures, so as to achieve the system and operations described above.

Figure 2:
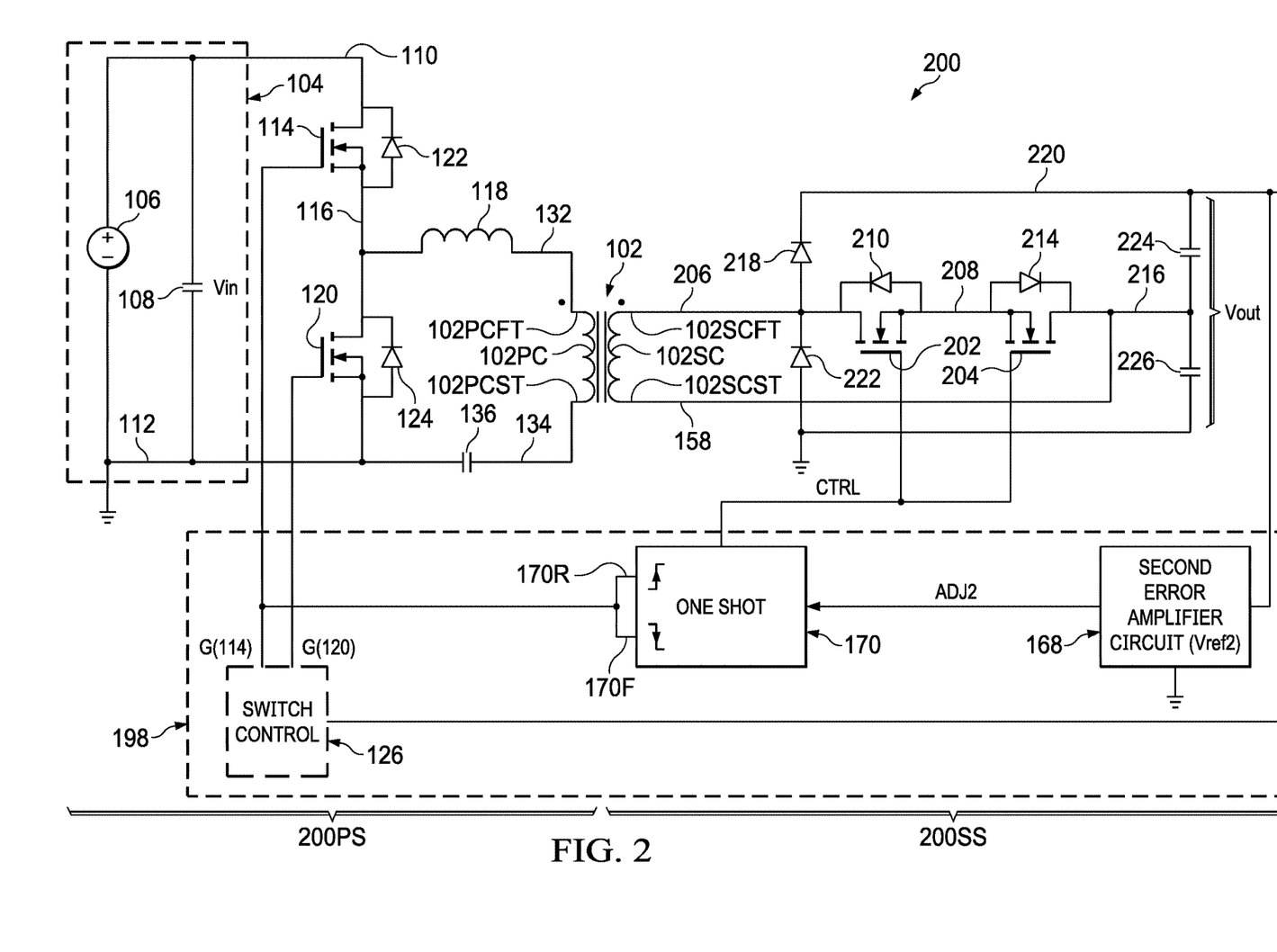
FIG. 2 is an electrical diagram of an alternative example embodiment LLC converter.

FIG. 2 is an electrical diagram of an alternative example embodiment LLC converter 200, which again converts a DC input voltage Vin to a DC output voltage Vout. The converter 200 includes various of the same items as the FIG. 1A converter 100, so like reference numbers are used in FIG. 2 for such items. Also in that regard, the FIG. 2 converter 200 includes a primary side 200PS which has the same items as the FIG. 1A primary side 100PS, and the FIG. 2 converter 200 includes a secondary side 200SS that includes the second error amplifier circuit 168 and the one shot 170. The FIG. 2 converter 200 includes two general differences from the FIG. 1A converter 100, each of which is detailed below.

One difference between the FIGS. 1A and 2 converters is that the FIG. 2 converter 200 implements the transformer secondary-shorting switch, shown as switch 156 in FIG. 1A, as a first and second semiconductor switch 202 and 204 connected in anti-series, meaning having PN junctions (e.g., diodes or field effect transistors) where, without additional enabling control, both cannot conduct at the same time. Particularly, the first terminal 102SCFT of the transformer secondary 102SC is connected to a ninth node 206, which is further connected to the drain of the semiconductor switch 202, for example an NMOS enhancement transistor, having its source connected to a tenth node 208 and a body diode 210 with its anode connected to the tenth node 208 and its cathode connected to the ninth node 206. The tenth node 208 is further connected to the source of the semiconductor switch 204, for example an NMOS enhancement transistor, having its drain connected to an eleventh node 216 and a body diode 214 with its anode connected to the tenth node 208 and its cathode connected to the eleventh node 216. The eleventh node 216 is also connected to a second terminal 102SCST of the transformer secondary 102SC. The gate of each of the semiconductor switches 202 and 204 is connected to be controlled by the one shot 170.

Another difference between the FIGS. 1A and 2 converters is that the secondary side 200SS of the FIG. 2 converter 200 implements doubler rectification. Particularly, the ninth node 206 is connected to the anode of a fifth diode 218, which has its cathode connected to a twelfth node 220, and the ninth node 206 is also connected to the cathode of a sixth diode 222, which has its anode connected to ground. Further, the secondary side 200SS includes a first and second series-connected output capacitor 224 and 226, where the first series-connected output capacitor 224 is connected between the twelfth node 220 and the eleventh node 216, and the second series-connected output capacitor 226 is connected between the eleventh node 216 and ground. The converter 200 output voltage, Vout, is across the combination of the first and second series-connected output capacitors 224 and 226.

During operation of the LLC converter 200, if there is no difference detected, or residual value from an immediately preceding detected difference, by the second error amplifier circuit 168 between Vout and Vref2, then ADJ2 is zero and the one shot 170 de-asserts CTRL to both of the first and second semiconductor switches 202 and 204, which in response are off. Further, when the switch control 126 then asserts G(114) and thereby turns on the first transistor 114 (while the second transistor 120 is off), generally resonant currently flows clockwise through the primary side 200PS resonant tank, and energy is transferred to by the transformer 102 to the secondary side 200, where counterclockwise current flows. The primary side 200PS current flow from the first transistor 114 being on is as described above relative to the FIG. 1A converter 100. In the secondary side 200SS, the counterclockwise current flow is through the doubler configuration. Particularly, the second terminal 102SCST of the secondary coil 102SC polarity is positive to the eleventh node 216, so that current flows thereto, through (and charging) the second series output capacitor 226, then through the sixth diode 222 to the ninth node 206, which is connected to the first terminal 102SCFT of the secondary coil 102SC. Similarly, when the switch control 126 asserts G(120) and thereby turns on the second transistor 120 (while the first transistor 114 is off), generally resonant currently flows counterclockwise through the primary side 200PS resonant tank, and energy is transferred by the transformer 102 to the secondary side 200SS, where clockwise current flows. The primary side 200PS current flow from the second transistor 120 being on is again as described above relative to the FIG. 1A converter 100. In the secondary side 200SS, the clockwise current flow is also through the doubler configuration. Particularly, the first terminal 102SCFT of the secondary coil 102SC polarity is positive to the ninth node 206, so that current flows thereto, through the fifth diode 218 to the twelfth node 220, then through (and charging) the first series output capacitor 224 to the eleventh node 216, which is connected to the second 102SCST terminal of the secondary coil 102SC. Accordingly, after a duration of the second transistor 120 on with charge to the first series output capacitor 224, preceded by a duration of the first transistor 114 on with charge to the second series-connected output capacitor 226, the total charge across both capacitors 224 and 226 is additive, so that Vout is nominally doubled relative to Vin (and another multiplier, such as the transformer 120 turn ratio).

During operation of the LLC converter 200, if Vout falls below Vref2, the second error amplifier circuit 168 produces a non-zero ADJ2 toward returning Vout to at least Vref2. The non-zero ADJ2 causes the one shot 170 to assert CTRL proportionately to the value of ADJ2, which causes both of the first and second semiconductor switches 202 and 204 to turn on, thereby shorting together the secondary coil 102SC first terminal 102SCFT and second terminal 102SCST through the source/drain path of both of those switches 202 and 204. The result during such conditions is comparable to that described above with respect to the FIG. 1A converter 100, that is, additional energy is stored to the inductor 118. Thereafter, either for a remaining portion of the on-time for either the first or second transistor 114 and 120, or once the non-zero difference between Vout and Vref2 is resolved (including any residual non-zero output of the second error amplifier circuit 168), the one shot 170 de-asserts CTRL. The de-asserted CTRL disables the switches 202 and 204, thus removing the short-circuit between the secondary coil 102SC first and second terminals 102SCFT and 102SCST, after which either the additional energy from the inductor 118 may transfer from the primary side 200PS to the secondary side 200SS, thereby increasing Vout, or during periods when Vout is satisfactory, the converter 200 operates without effect from the switches 202 and 204.

Figure 3A:
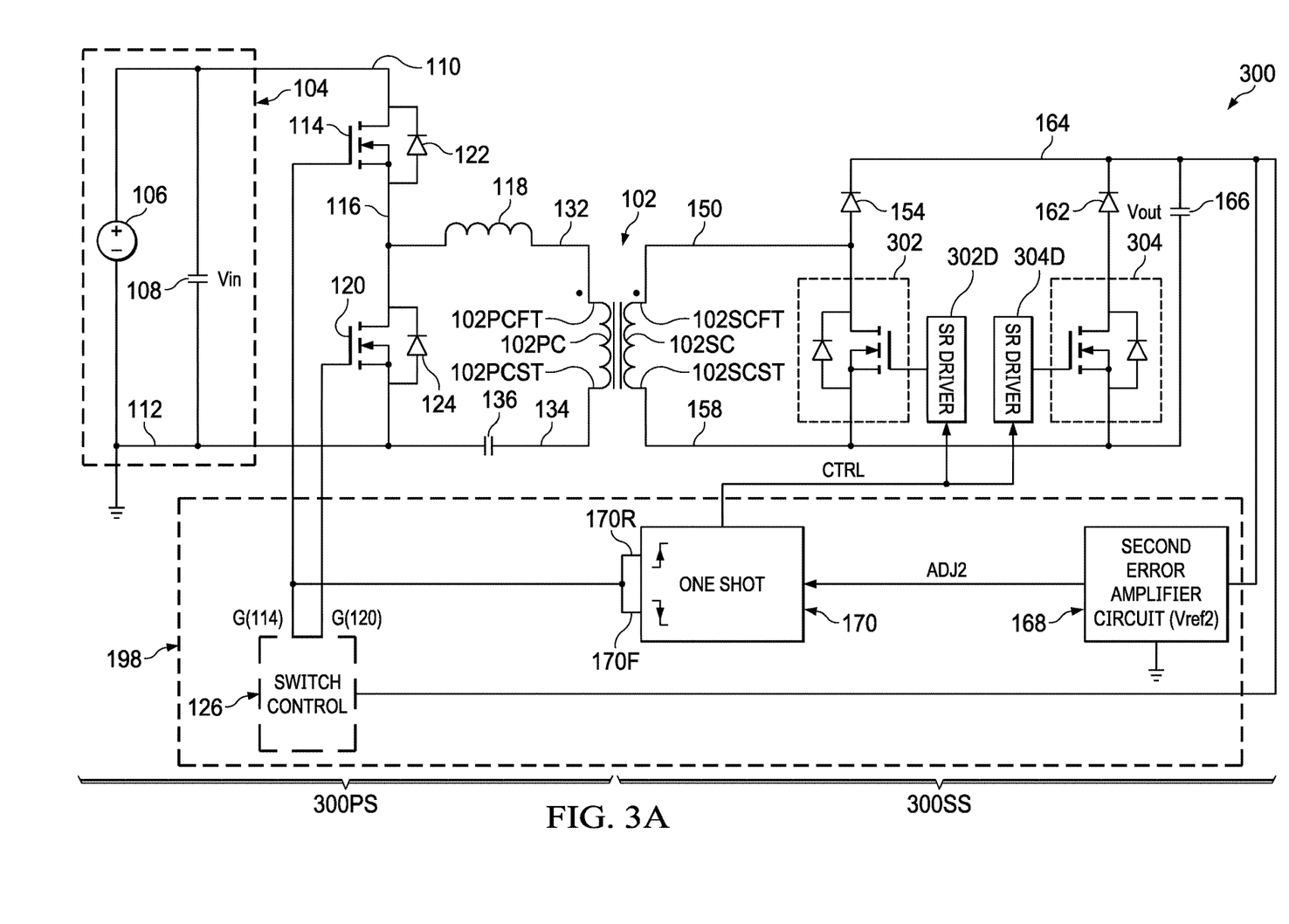
FIG. 3A is an electrical diagram of an alternative example embodiment LLC converter.

FIG. 3A is an electrical diagram of an alternative example embodiment LLC converter 300, which again converts a DC input voltage Vin to a DC output voltage Vout. The converter 300 includes the same items as the FIG. 1A converter 100, with the exception that in its secondary section 300SS, a first and second synchronous rectifier 302 and 304 are included in place of the FIG. 1A first and fourth diodes 152 and 160, respectively. Specifically, the first synchronous rectifier 302 includes a MOS transistor with its source, and body diode anode, connected to the second node 112 (e.g., ground), and its drain, and body diode cathode, to the sixth node 164. Further, a synchronous rectifier driver 302D controls the gate of the synchronous rectifier 302 MOS transistor. Additionally, the second synchronous rectifier 304 includes a MOS transistor with its source, and body diode anode, connected to the second node 112 (e.g., ground), and its drain, and body diode cathode, to the seventh node 158. Further, a synchronous rectifier driver 304D controls the gate of the synchronous rectifier 304 MOS transistor. Lastly, the one shot 170 outputs the CTRL signal to both the synchronous rectifier driver 302D and the synchronous rectifier driver 304D, so that when CTRL is asserted, each controls its respective synchronous rectifier 302 and 304 to concurrently conduct.

The operation of the data converter 300 will be appreciated by one skilled in the art, further given this document's teachings.

When Vout is stabilized at or above Vref2 in FIG. 3A and any non-zero residual is resolved so that ADJ2 equals zero, the one shot does not assert CTRL. Under these conditions, when the first transistor 114 is on, a counterclockwise current in the secondary side 300SS passes from the positive polarity of the secondary coil 102SC second terminal 102SCST, through the fourth diode 162, the output capacitor 166, and then through the source/drain path of the synchronous rectifier 302 transistor, which is appropriately turned on (synchronized) by the synchronous rectifier driver 302D during this time. Similarly, when the second transistor 120 is on, a clockwise current in the secondary side 300SS passes from the positive polarity of the secondary coil 102SC first terminal 102SCFT, through the second diode 154, the output capacitor 166, and then through the source/drain path of the synchronous rectifier 304 transistor, which is appropriately turned on by the synchronous rectifier driver 304D during this time.

Figure 3B:
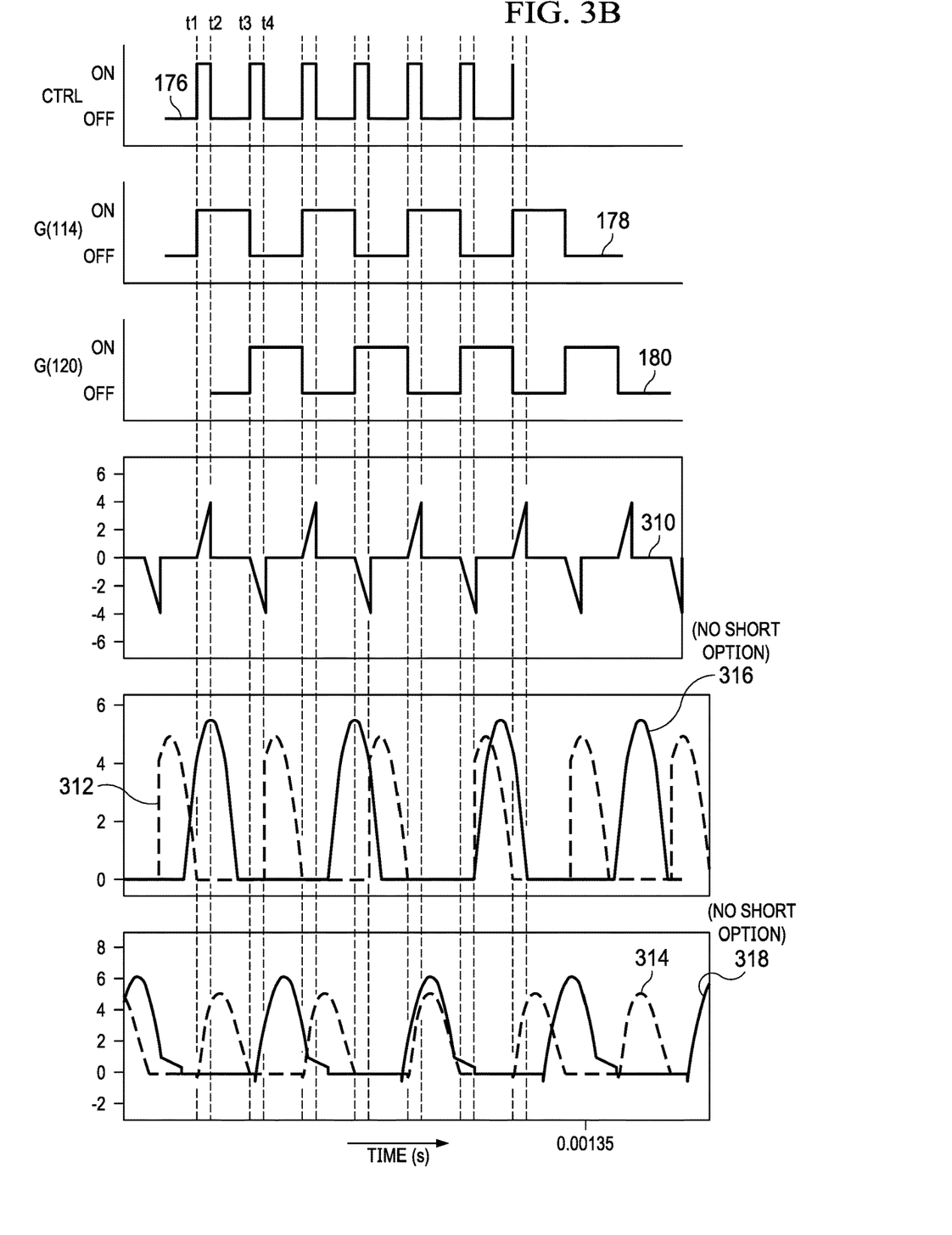
FIG. 3B illustrates a simulated timing diagram example of various signals associated with the FIG. 1A converter.

When Vout is not stabilized at or above Vref2 in FIG. 3A, the second error amplifier circuit 168 outputs a non-zero ADJ2 and in response the one shot 170 asserts CTRL for a proportional duration. Accordingly, each respective synchronous driver 302D and 304D controls its respective synchronous rectifier 302 and 304 to concurrently conduct, thereby shorting together the secondary coil 102SC first terminal 102SCFT and second terminal 102SCST. Certain related signal plots are shown in FIG. 3B, which illustrates a simulated timing diagram example of various signals associated with the converter 300, including the first three rows again from FIG. 1B. The remaining three rows illustrate a plot 310 through the conductive source/drain paths of both transistors in the synchronous rectifiers 302 and 304 during the time both are on to short-circuit the secondary coil 102SC, a plot 312 of current through only one of the source/drain paths of a transistor in one or the other of the synchronous rectifiers 302 and 304 during a time the secondary coil 102SC is not short-circuited and the corresponding transistor is on, and a plot 314 of current through the source/drain path of the first transistor 114. Additionally, each of the fifth and sixth rows, respectively, also shows a respective additional plot 316 and 318, by contrast, illustrating the higher current that would be required if the synchronous rectifier 302 and 304 were not included to provide selective short-circuiting of the secondary coil 102SC in the converter 100. Accordingly, as with the above-described data converters, the short circuited secondary coil 102SC causes additional energy to be stored in the inductor 118, which is thereafter transferred to the secondary side 300SS after the short-circuit is opened.

Figure 4A:
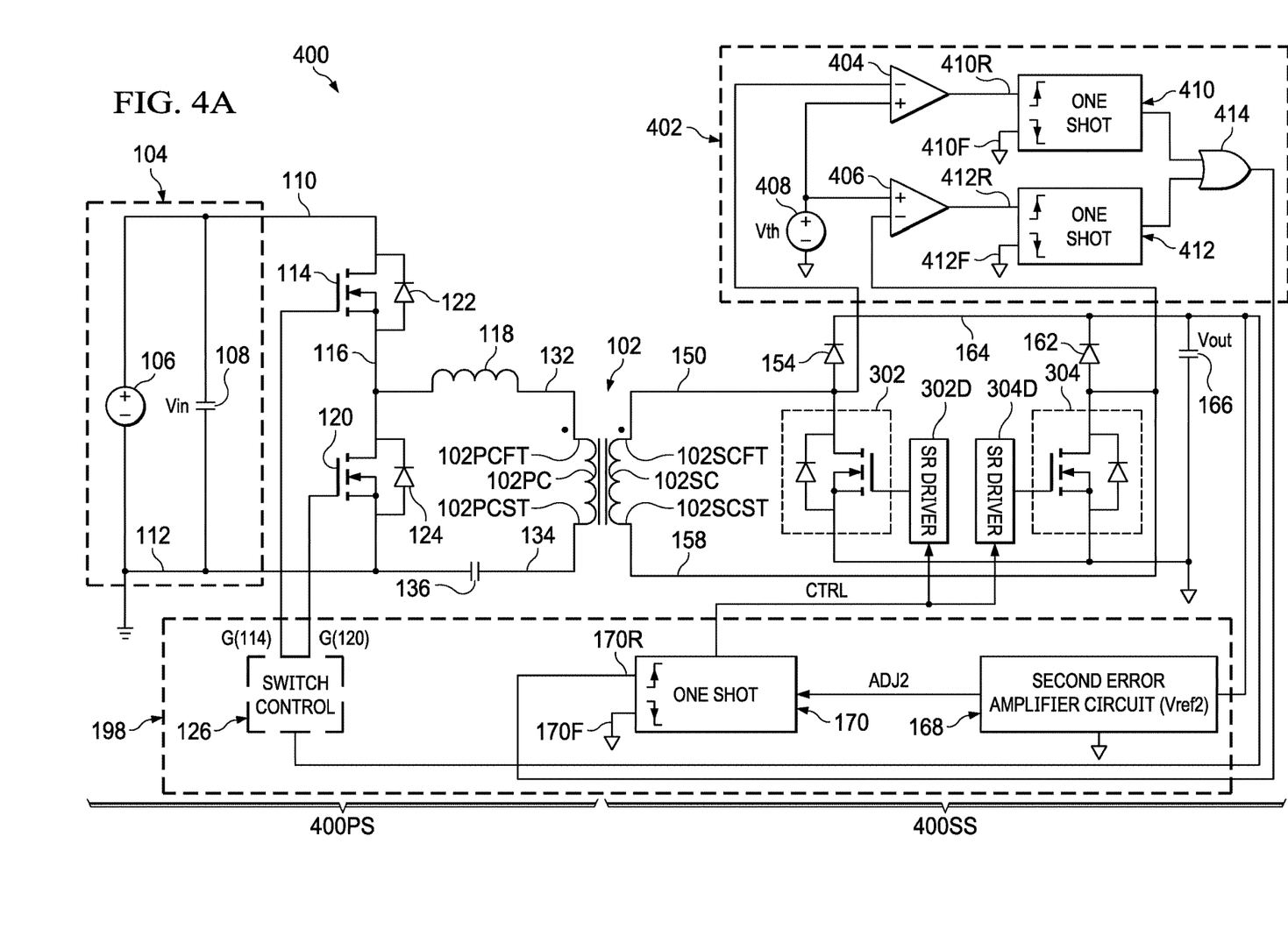
FIG. 4A is an electrical diagram of an alternative example embodiment LLC converter with a secondary side transition detector.

FIG. 4A is an electrical diagram of an alternative example embodiment LLC converter 400, which again converts a DC input voltage Vin to a DC output voltage Vout. The converter 400 includes many of the same items and connections as the FIG. 1A converter 100. However, the converter 400 provides different respective grounds to isolate its primary side 400PS from its secondary side 400S, unlike prior embodiments that illustrate a common ground connection to both converter sides. Additionally, with the ground isolation between primary and secondary, the converter 400 includes a secondary side transition detector 402, for detecting signal changes representative of switching transitions in the primary, so as to control the above-described triggering of the one shot 170. Specifically, the secondary side transition detector 402 includes a first comparator 404 and a second comparator 406. The inverting input of the first comparator 404 is connected to the first terminal 102SCFT of the transformer secondary coil 102SC, and the inverting input of the second comparator 406 is connected to the second terminal 102SCST of the transformer secondary coil 102SC. Each of the non-inverting input of the first comparator 404 and the non-inverting input of the second comparator 406 is connected to a threshold voltage reference source 408, which outputs a threshold voltage Vth, such as the secondary side ground. The output of the first comparator 404 is connected to a rising edge trigger input 410R of a first comparator one shot 410, and the falling edge trigger input 410F of the first comparator one shot 410 is connected to the secondary side ground. The output of the second comparator 406 is connected to a rising edge trigger input 412R of a second comparator one shot 412, and the falling edge trigger input 412F of the second comparator one shot 412 is connected to the secondary side ground. The output of the first comparator one shot 410 is connected to a first input of an OR gate 414, and the output of the second comparator one shot 412 is connected to a second input of the OR gate 414. The output of the OR gate 414 is connected to the rising edge trigger input 170R of the one shot 170.

Figure 4B:
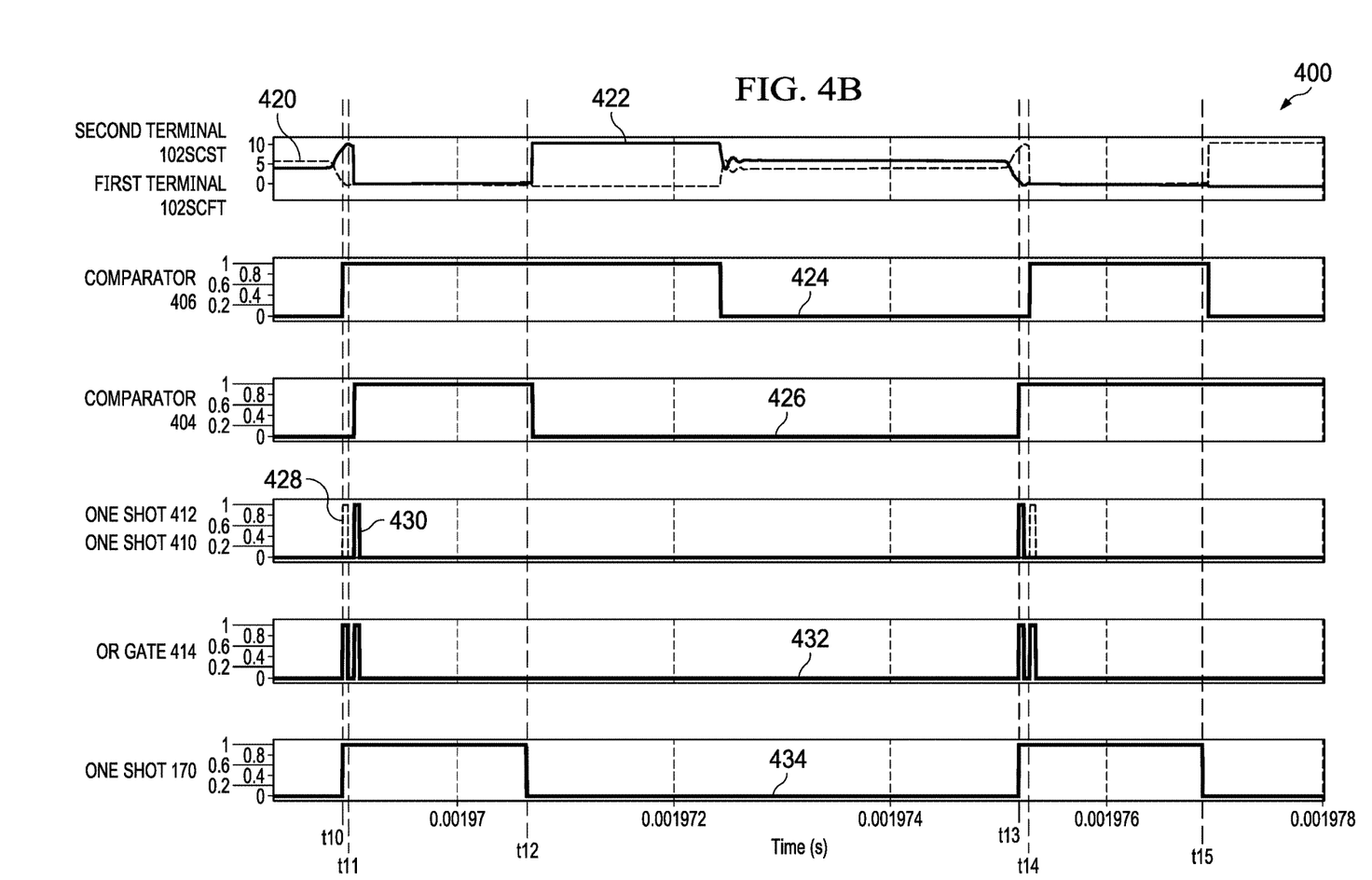
FIG. 4B illustrates a simulated timing diagram example of various signals associated with the FIG. 4A converter.

The operation of the FIG. 4A converter 400, and more particularly its secondary side transition detector 402, is now described, in connection also with associated timing diagram plots in FIG. 4B. Particularly, the FIG. 4B first row includes a plot 420 of the voltage at the secondary coil second terminal 102SCST and a plot 422 of the voltage at the secondary coil first terminal 102SCFT, the second row is a plot 424 of the output of the comparator 406, the third row is a plot 426 of the output of the comparator 404, the fourth row includes a plot 428 of the output of the one shot 412 and a plot 430 of the output of the one shot 410, the fifth row is a plot 432 of the output of the OR gate 414, and the sixth row is a plot 434 of the output of the one shot 170. Generally, the converter 400 eliminates any transfer of the primary side 400PS transistor drive signals from passing over the isolation barrier to the secondary side 400SS. Instead, the converter 400 deduces the primary side switching activity by monitoring the voltages at the secondary coil first and second terminals 102SCFT and 102SCST (the drain voltages of the first and second synchronous rectifiers 302 and 304). Accordingly, when a primary side 400PS switching transition occurs, for example at time t10, the voltage at the secondary coil second terminal 102SCST drops below ground in response to the primary side 400PS first transistor 114 turning on. This drop is sensed by the second comparator 406, which responsively outputs a high signal to the second comparator one shot 412, which responsively outputs a fixed duration response from time t10 to time t11. This high signal is input to the OR gate 414, which responsively outputs a high signal to trigger the one shot 170, which responsively outputs a high signal from time t10 to t12, the duration of which is controlled by the ADJ2 output of the second error amplifier 168. FIG. 4B illustrates similar operation at time t13, when the primary side 400PS second transistor 120 turns on, the voltage at the secondary coil first terminal 102SCFT responsively drops below ground, and the drop is sensed by the first comparator 404. The first comparator 404 responsively outputs a high signal to the first comparator one shot 410, which responsively outputs a fixed duration high signal from time t13 to time t14. This high signal is input to the OR gate 414, which responsively outputs a high signal to trigger the one shot 170, which responsively outputs a high signal from time t13 to t15, where again the high signal one shot duration is controlled by ADJ2. Accordingly, while the converter 400 isolates the primary side 400PS and the secondary side 400SS, and therefore there is no direct access to the drive signal (referenced to the primary ground) to initiate the conduction of the bidirectional switch 156 (referenced to the secondary ground), the converter 400 accomplishes a proper timing of the one shot 170 operation. Further, it will be apparent to those versed in the art that the signals necessary to initiate the conduction of the bidirectional switch 156 can be generated by sensing the voltage in the secondary side 400SS and processing the signal in ways other than the described above.

Figure 5:
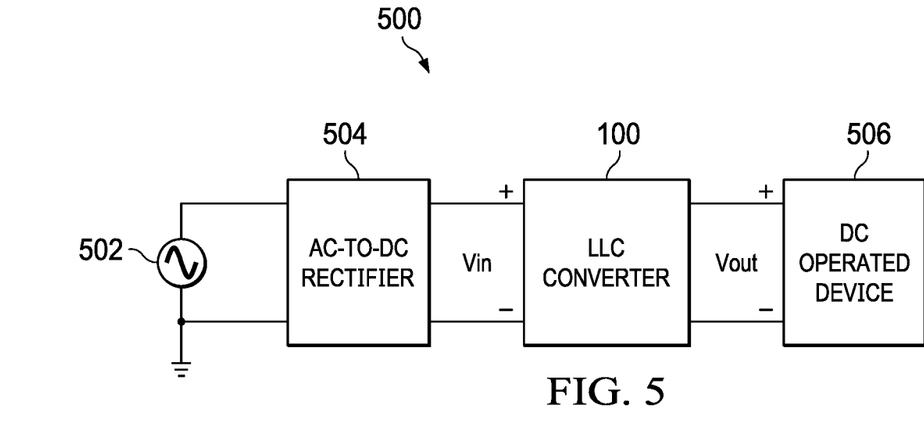
FIG. 5 is an electrical diagram of an example embodiment system.

FIG. 5 is an electrical diagram of an example embodiment system 500. The system 500 includes an AC voltage source 502 providing an AC signal connected to an AC-to-DC rectifier 504, where the rectified DC voltage is shown as Vin to correspond to earlier Figures. Vin from the rectifier 504 is connected to an LLC converter, which for example can be the rectifier 100 (or any of the others rectifiers 200, 300, or 400) described above. The LLC converter 100 converts Vin to Vout, and Vout is connected to a DC operated device 506. The DC operated device 506 may be any electronic functional device that requires a DC voltage for operation. For example, the example embodiment converters 100, 200, 300, and 400 provide favorable stability in Vout when there are interruptions in Vin, so the DC operated device 506 may be a device that benefits from such performance, or is otherwise vulnerable if connected to a voltage source that varies. For example, if the DC operated device 506 is a computational or processor-based system (computer, laptop, consumer electronic, and the like), then fluctuations in power supply voltage can cause the system to continuously and undesirably reboot. The system 500 is protected from such behavior due to the stable Vout provided the LLC converter 100.

From the description above, numerous example embodiments provide an LLC converter, and various benefits are possible. For example, different embodiments of the system may have various aspects, including different types of switches for selectively short circuiting the converter secondary coil during a portion of the period when either primary side switching device is on. The selective short circuiting stores additional energy to the primary, which may be transferred to the secondary when the short circuit is removed from the secondary coil. Accordingly, output voltage can be maintained with smaller tank circuit devices as compared to the prior art, thereby reducing size/volume and cost, and with less variation in operational frequency and decreased DC bus capacitance. Further, various different components may be used to embody functions described herein, for example also in the first and second error amplifier circuits 126 and 168, and the one shot 170. Still further, while an example embodiment includes two different respective references, one controlling the secondary short circuit and the other controlling switching frequency, an alternative embodiment may exclude a reference that adjusts operational frequency. Additional modifications are possible in the described embodiments, and other embodiments are possible, within the scope of the claims.

What is claimed is:

1. A voltage converter, comprising:
a transformer having a primary coil and a secondary coil;
primary side circuitry coupled to the primary coil, wherein the primary side circuitry includes a first switching circuit;
a one-shot circuit having a one-shot output and a one-shot input;
a first transistor having first and second current terminals and a first control terminal, wherein the first current terminal is coupled to a first terminal of the secondary coil, and the first control terminal is directly connected to the one-shot output;
a second transistor having third and fourth current terminals and a second control terminal, wherein the third current terminal is coupled to the second current terminal, the fourth current terminal is directly connected to a second terminal of the secondary coil, and the second control terminal is directly connected to the first control terminal;
a diode having an anode directly connected to the first current terminal, and a cathode directly connected to an output terminal; and
a capacitor having first and second capacitor terminals, wherein the first capacitor terminal is directly connected to the cathode of the diode, and the second capacitor terminal is directly connected to the fourth current terminal.

2. The voltage converter of claim 1 in which the primary side circuitry includes an inductor.

3. The voltage converter of claim 1 in which the capacitor is a first capacitor, and the primary side circuitry includes a first inductor, a second inductor, and a second capacitor.

4. The voltage converter of claim 3 in which the first inductor is a magnetic inductance in the primary coil.

5. The voltage converter of claim 1, further comprising secondary side circuitry coupled to the secondary coil.

6. The voltage converter of claim 5 wherein the secondary side circuitry includes an output capacitor.

7. The voltage converter of claim 1 in which the first and second transistors are field effect transistors (FETs).

8. The voltage converter of claim 1, further comprising a variable frequency source configured to provide a switching frequency signal to the first switching circuit.

9. The voltage converter of claim 8, further comprising an error amplifier circuit coupled to the output terminal, and configured to control a frequency of the variable frequency source in response to a deviation of a voltage at the output terminal relative to a reference voltage.

10. The voltage converter of claim 8 in which the first switching circuit includes a first switch configured to provide current to the primary side circuitry during a first period, and a second switch configured to provide current to the primary side circuitry during a second period that differs from the first period.

11. The voltage converter of claim 10, further comprising an error amplifier circuit having an error input and an error output, wherein the error input is coupled to the output terminal, the error output is coupled to the one-shot input, and the error amplifier circuit is configured to trigger the one-shot circuit responsive to a deviation of a voltage at the output terminal compared to a reference voltage.

12. The voltage converter of claim 1, further comprising an error amplifier circuit coupled to the output terminal, and configured to trigger the one-shot circuit responsive to a deviation of a voltage at the output terminal compared to a reference voltage.

13. The voltage converter of claim 12 in which the error amplifier circuit is configured to control a duration of each of the first and second transistors being turned on responsive to the deviation of the voltage at the output terminal compared to the reference voltage.

14. The voltage converter of claim 1, wherein the one-shot circuit is configured to control a duration of each of the first and second transistors being turned on responsive to a deviation of a voltage at the output terminal compared to a reference voltage.

15. The voltage converter of claim 14 in which the one-shot circuit is coupled to the primary side circuitry.

16. The voltage converter of claim 14 in which the one-shot circuit is isolated from the primary side circuitry and configured to provide a signal responsive to a transition in a second switching circuit.

17. A voltage converter, comprising:
a transformer having a primary coil and a secondary coil;
first switching circuitry configured to provide current through circuitry coupled to the primary coil;
a one-shot circuit having a one-shot output and a one-shot input;
a first transistor having first and second current terminals and a first control terminal, wherein the first current terminal is coupled to a first terminal of the secondary coil, and the first control terminal is directly connected to the one-shot output;
a second transistor having third and fourth current terminals and a second control terminal, wherein the third current terminal is coupled to the second current terminal, the fourth current terminal is directly connected to a second terminal of the secondary coil, and the second control terminal is directly connected to the first control terminal;
a diode having an anode directly connected to the first current terminal, and a cathode directly connected to an output terminal; and
a capacitor having first and second capacitor terminals, wherein the first capacitor terminal is directly connected to the cathode of the diode, and the second capacitor terminal is directly connected to the fourth current terminal.

18. A voltage controlled system, comprising:
a rectifier coupled to a first voltage source and configured to provide a second voltage source;
an input terminal coupled to the second voltage source;
primary circuitry configured to be coupled to a primary coil of a transformer;
a first secondary terminal configured to be coupled to a first terminal of a secondary coil of the transformer;
a second secondary terminal configured to be coupled to a second terminal of the secondary coil of the transformer;
a first switching circuit configured to provide current to the primary circuitry;
a one-shot circuit having a one-shot output and a one-shot input;
a first transistor having first and second current terminals and a first control terminal, wherein the first current terminal is coupled to the first secondary terminal, and the first control terminal is directly connected to the one-shot output;
a second transistor having third and fourth current terminals and a second control terminal, wherein the third current terminal is coupled to the second current terminal, the fourth current terminal is directly connected to the second secondary terminal, and the second control terminal is directly connected to the first control terminal;
a diode having an anode directly connected to the first current terminal, and a cathode directly connected to an output terminal;
a capacitor having first and second capacitor terminals, wherein the first capacitor terminal is directly connected to the cathode of the diode, and the second capacitor terminal is directly connected to the fourth current terminal; and
a device coupled to the output terminal, wherein the device is powered by a current from the output terminal.

* * * * *